(12) United States Patent (10) Patent No.: US 8,245,224 B2
Fontijn (45) Date of Patent: Aug. 14, 2012

(54) RETRIEVING DATA FROM AN INFORMATION CARRIER

(75) Inventor: Wilhelmus Franciscus Johannes Fontijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1520 days.

(21) Appl. No.: 10/570,537

(22) PCT Filed: Aug. 26, 2004

(86) PCT No.: PCT/IB2004/051574
§ 371 (c)(1),
(2), (4) Date: Mar. 3, 2006

(87) PCT Pub. No.: WO2005/024622
PCT Pub. Date: Mar. 17, 2005

(65) Prior Publication Data
US 2007/0089109 A1 Apr. 19, 2007

(30) Foreign Application Priority Data
Sep. 11, 2003 (EP) ..................................... 03103354

(51) Int. Cl.
*G06F 9/44* (2006.01)
*G06F 9/445* (2006.01)
*G06F 15/177* (2006.01)
*G11B 11/10* (2006.01)

(52) U.S. Cl. ............ 717/177; 717/168; 717/174; 713/1; 713/2; 369/47.21; 369/53.21

(58) Field of Classification Search ........................ None
See application file for complete search history.

(56) References Cited

U.S. PATENT DOCUMENTS

| 5,315,570 | A | * | 5/1994 | Miura et al. | 369/47.24 |
| 5,809,006 | A | * | 9/1998 | Davis et al. | 369/47.49 |
| 5,870,364 | A | * | 2/1999 | Raczynski | 369/52.1 |
| 6,378,010 | B1 | * | 4/2002 | Burks | 710/68 |

(Continued)

FOREIGN PATENT DOCUMENTS

WO 9942924 A1 8/1999

(Continued)

OTHER PUBLICATIONS

Andy Cohen, "Video Game Console Modification" [Online], 2009, pp. 1-10, [Retrieved from Internet on 04/201012], <http://cognosys.net/classes/fall10/cs446/resources/Console%20Modification%20report.pdf>.*

(Continued)

*Primary Examiner* — Thuy Dao
*Assistant Examiner* — Ziaul A Chowdhury

(57) ABSTRACT

A method of retrieving content data and instructional data from a storage medium includes providing a storage medium having content data and instructional data, the content data having a physical and logical format on the storage medium that is known to the instructional data, wherein the instructional data includes plug-in data and has a physical and logical format on the storage medium that is known to firmware of a storage medium reading device, and further wherein the physical and logical format of the content data on the storage medium is incompatible and unknown to the firmware of the storage medium reading device. The method further includes retrieving, via the firmware, the instructional data from a predefined position on the storage medium and retrieving, via the firmware in cooperation with the instructional data, the content data from the storage medium.

8 Claims, 2 Drawing Sheets

U.S. PATENT DOCUMENTS

| | | | |
|---|---|---|---|
| 6,553,180 B1* | 4/2003 | Kikuchi et al. | 386/95 |
| 6,662,060 B1* | 12/2003 | Maliszewski et al. | 700/94 |
| 6,707,774 B1* | 3/2004 | Kuroda et al. | 369/53.21 |
| 6,715,144 B2* | 3/2004 | Daynes et al. | 717/174 |
| 6,829,672 B1* | 12/2004 | Deng et al. | 711/103 |
| 6,842,856 B2* | 1/2005 | Shenassa et al. | 713/1 |
| 6,973,015 B1* | 12/2005 | Murakami et al. | 369/47.21 |
| 7,032,218 B2* | 4/2006 | Shirasawa et al. | 717/168 |
| 7,215,610 B2* | 5/2007 | Sako et al. | 369/47.12 |
| 7,362,677 B2* | 4/2008 | Morimoto et al. | 369/53.21 |
| 7,607,002 B2* | 10/2009 | Padilla et al. | 713/1 |
| 7,681,027 B2* | 3/2010 | Rothman et al. | 713/2 |
| 7,730,482 B2* | 6/2010 | Illowsky et al. | 717/177 |
| 2002/0013939 A1* | 1/2002 | Daynes et al. | 717/11 |
| 2002/0110075 A1* | 8/2002 | Lee | 369/111 |
| 2002/0169949 A1* | 11/2002 | Shenassa et al. | 713/1 |
| 2003/0023807 A1* | 1/2003 | Yamamoto et al. | 711/112 |
| 2003/0030852 A1* | 2/2003 | Sampson et al. | 358/479 |
| 2003/0135661 A1* | 7/2003 | Barker et al. | 709/316 |

FOREIGN PATENT DOCUMENTS

| | | |
|---|---|---|
| WO | 0167753 A1 | 9/2001 |

OTHER PUBLICATIONS

Joseph Tucek et al., "Trade-offs in Protecting Storage" [Online], 2005, pp. 1-12, [Retrieved from Internet on Apr. 20, 2012], <http://eecourses.technion.ac.il/049030/MSST2005/data/34_tucekj_tradeoffs.pdf>.*

Rich Gadomski, "The Versatile DVD Media Formats: Which One Is Best?" [Online] 2002, pp. 1-4, [Retrieved from Internet on Apr. 20, 2012], <http://www.maxellcanada.com/pdfs/c_media/versatile/%20dvd.pdf>.*

Peter M. Chen et al, "Rio: Storing Files Reliably in Memory", [Online], 1995, pp. 1-9, [Retrieved from Internet on Apr. 20, 2012], <http://www.eecs.umich.edu/techreports/cse/95/CSE-TR-250-95.pdf>.*

* cited by examiner

RETRIEVING DATA FROM AN INFORMATION CARRIER

The invention relates to a method of retrieving content data and instructional data from a storage medium.

The invention further relates to a system of retrieving content data and instructional data from a storage medium.

The invention further relates to a computer program product designed to perform such a method.

The invention further relates to an information carrier comprising such a computer program product.

The invention further relates to an entertainment device comprising such a system.

Currently, when a Consumer Electronics device (CE) device, like a Compact Disk (CD) player, needs to be able to handle a new disk format, the firmware of the CD player needs to be replaced completely or the CD player as such needs to be replaced by a new version that can handle the new disk format. Replacing the firmware can be done automatically, as described in WO 99/42924. Here, a method of updating firmware between an imaging device, i.e. a camera, and a host system, i.e. a personal computer, is described. The host system detects that the firmware on the imaging device is incompatible with a configuration of the host system. In response to detecting the incompatibility, an update for the firmware is transferred from the host system to the imaging device. The firmware allows the imaging device to communicate with software on the host system. The update for the firmware includes instructions for performing various functions. For example, determine the exposure of an image, sense color in a particular manner, compress image data, etc. When the firmware of the imaging device is updated, the imaging device can for example, handle a new file format.

It is an object of the current invention to provide a method according to the opening paragraph that handles an incompatibility between a device and a storage medium in an improved way. In order to achieve this object, the content data has a format on the storage medium that is known to the instructional data, the instructional data has a format on the storage medium that is known to firmware, the firmware is installed into a storage medium reading device and the method comprises: retrieving, by means of the firmware, the instructional data from a predefined position on the storage medium; retrieving, by means of the firmware in cooperation with the instructional data, the content data from the storage medium. By providing a storage medium that comprises the instructional data that controls how to read the contents of the storage medium, this data does not need to be pre-installed into firmware of a storage medium reading device, before the storage medium can be read by this device. This data is also referred to as "plug-in data". In stead the plug-in data travels with the disk that also comprises content data with, for example a new file format. Now, the plug-in can be installed during the mounting procedure of the storage medium and control can be handled to the plug-in in order to correctly mount the remainder of the storage medium.

An embodiment of the invention is described in claim 2. By locating the instructional data at a geometrically fixed location upon the storage medium, computer readable code that is designed to read the contents of the storage medium, also called driver code, knows where a plug-in is expected on the disk and can act accordingly if a plug-in is detected.

An embodiment of the invention is described in claim 3. By integrating the instructional data into an integrated circuit located at the storage medium, the integrated circuit can be read before the storage medium is mounted completely. Further, the driver code can now first access the integrated circuit before mounting the storage medium.

An embodiment of the invention is described in claim 4. By locating the instructional data at an address that is relative to a physical address upon the storage medium, the driver code, knows where a plug-in is expected at the disk and can act accordingly if a plug-in is detected.

An embodiment of the invention is described in claim 5. By using the information about the content data to interpret the contents of the content data, the plug-in takes care that the content data is correctly interpreted by the driver code.

An embodiment of the invention is described in claim 6. By using the information about the content data to determine access rights for the content data, the plug-in can be used to control access to the content data.

An embodiment of the invention is described in claim 7. By using the information about the content data that comprises a physical format of the storage medium, the plug-in takes care that the driver code can read this physical format.

An embodiment of the invention is described in claim 8. By using the information about the content data that comprises a logical format of the storage medium, the plug-in takes care that the driver code can read this logical format.

It is a further object of the current invention to provide a system according to the opening paragraph that handles an incompatibility between a device and a storage medium in an improved way. In order to achieve this object, the content data has a format on the storage medium that is known to the instructional data, the instructional data has a format on the storage medium that is known to the system, the system being conceived to retrieve the instructional data from a predefined position on the storage medium; the system being further conceived to retrieve, in cooperation with the instructional data, the content data from the storage medium. These and other aspects of the invention will be apparent from and elucidated with reference to the embodiments described hereinafter as illustrated by the following Figures:

FIG. 2 illustrates an embodiment of the method according to the invention for a high level physical plug-in;

Currently, the Personal Computer (PC) world is used to rapid successions of encoders/decoders (codecs) and formats for, for example, audio and/or video stream formats. Within the Consumer Electronics world (CE) world, more and more formats are being defined for optical disks. A Digital Versatile Disk (DVD) player must allow to play for example Compact Disk (CD), Super Audio Compact Disk (SACS), Photo CD, Video CD (VCD), and MP3. However, a CE device, like a DVD player, is less flexible than a PC. In order to update a CE device for a new codec or a new format, either the firmware of the CE device must be updated or a new CE device must be installed. Both options are not very attractive. The first option to update the firmware is not attractive to the CE device manufacture, since the manufacturer is not in control of the CE device, but the user of the CE device is in control. The second option is not attractive to the user of the CE device, because he/she has to install a new CE device each time a firmware update is required.

Figure 1:
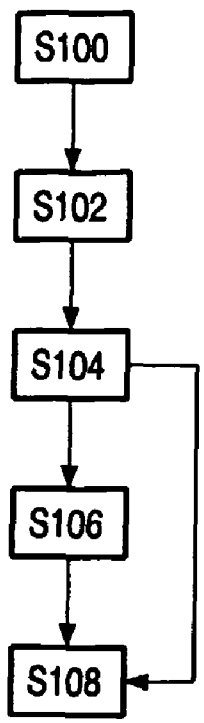
FIG. 1 illustrates an embodiment of the method according to the invention.

FIG. 1 illustrates an embodiment of the method according to the invention for a low level physical plug-in. A low level physical plug-in could have an effect upon the physical block numbering. Other examples are: redefinition of the sector format, Error Correction Code (ECC) type, replacing Cross Interleave Reed-Solomon Code 4 (CIRC4) with CIRC7 or replacing the Eight to Fourteen Modulation (EFM) table Within the first step S100, a DVD disk is submitted to a DVD disk reader. The DVD disk reader is attached to a computing device. The computing device is operable to execute computer readable code designed to receive and send operating commands from and to the DVD disk reader. This computer readable code is also referred to as driver code. The computing device can for example be a DVD-player, or a Television Set, a personal digital assistant (pda), etc. The computing device further comprises firmware as computer readable code that is designed to, amongst others, interpret data being read from a DVD disk.

Within the next step S102, the DVD disk is mounted physically by the DVD disk reader. The physical mounting process depends amongst others upon the type of DVD. The type of DVD is also determined during this mounting process.

Next, within step S104, the driver code scans the disk at a predefined geometrical location. For example, scanning at a radius of 10 millimeter from the center of the DVD. If the driver code is able to detect data at the predefined geometrical position, the method continues to step S106. If the driver code is not able to detect the data at the predefined geometrical position, the method continues to step S108.

Within step S106, the detected data is read by the driver code and installed, to enable the firmware to access the driver code. The firmware for the drive that is able to use plug-ins has provisions to handle plug-ins. There may be different types of plug-ins and the firmware may have different ways of handling different types of plug-ins. The plug-in itself (or a plug-in pointer) identifies the plug-in type. Based on the type indicator the firmware knows how to handle the plug-in. The plug-in is loaded into a separate portion of volatile memory; preferably without overwriting the firmware. It is also possible, that there are multiple portions (or slots) of memory for multiple plug-ins. The firmware is preferably not stored in read only memory (ROM), but in Flash non-volatile Random Access Memory (RAM). However, the firmware could be stored in ROM. The plug-in is transient and only valid for the disc currently being mounted. The firmware does not change but the plug-in provides for new subroutines or procedures that the firmware uses instead of the standard ones. For example, suppose that during normal operation of the firmware code at a certain stage a physical block number needs to be calculated. Instead of a direct call to the internal firmware procedure performing this calculation it is first checked whether a plug-in has been loaded and whether this plug-in specifies a different procedure for calculating the physical block numbering. If there is no temporary replacement procedure loaded in a plug-in slot the standard (internal) code is executed. If a there is plug-in code loaded for physical block number calculations it supersedes the firmware code and is executed instead of the internal code.

Other examples include inserted code. The firmware includes conditional procedure calls to procedures that may or may not be present based on the plug-in loaded. If a parameter is specified in the firmware, the firmware may check for a replacement value before using the parameter.

Standard firmware code could look like:

```
call x
call y
call z (p)
```

The plug-in enabled firmware code conditionally re-routes procedure calls. For example:

```
if plug-in loaded call k
call x
if plug-in loaded call y' else call y
if plug-in loaded call z (p') else call z (p)
```

Then, in this case where the plug-in is not a single replacement procedure or the plug-in starts with a definition table of the content, the plug-in contains for example the following:

```
parameter p' = 12
parameter q' = ...
...
Procedure x' is located at address adr#1
Procedure y' is located...
```

The addresses is relative to the start of the plug-in code, making the address independent from the location of the plug-in in memory Further, the plug-in enabled firmware code keeps flags for the presence of replacement or inserted code or parameters. For example:

Alternative_x_present=true

The value of this flag is evaluated before the execution of procedure x.

After step S106, the method continues with step S108, within which the DVD disk is further mounted physically by starting with scanning the lead-in area of the DVD disk. During this mounting step, the information comprised within the newly installed data is used as previously described. For example, in the case that the newly installed data comprises a specification of calculating the physical block numbering (PBN) for the DVD, the PBN is now calculated using this specification.

Figure 2:
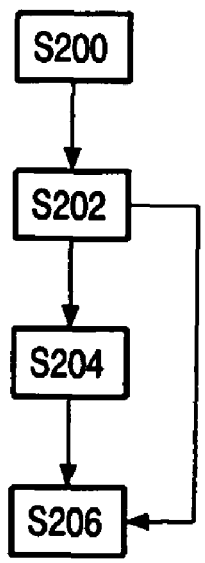

FIG. 2 illustrates an embodiment of the method according to the invention for a high level physical plug-in. A high level physical plug-in has for example an effect upon the logical block numbering Within the first step S200, the DVD disk is mounted physically.

Within the next step S202, the driver code scans the Table of Contents (TOC) in the lead-in area of the disk for a POINT value. The POINT value identifies where the following address points to. For instance, for DVD, the "Content Provider information" area in the "Control data block" located in the "Control data zone" of the Lead-In can be used This POINT value indicates if a plug-in is present by pointing to the PBN of the start of the plug-in data. To indicate that a plug-in is present also other mechanisms can be used like using the value of the PBN, etc. If the POINT value is found in the TOC, the method continues with step S204. If the POINT value is not found in the TOC, the method continues with step S206.

Within step S204, the driver code jumps to the PBN read from the TOC and reads the plug-in data. Further, the plug-in data is loaded into memory Within the next step S206, the disk is further mounted logically. During this mounting process the information comprised within the newly installed plug-in is used. For example, in the case that the newly installed plug-in comprises a specification of translating the physical address into the logical address for the DVD, the logical address is now calculated using this specification.

Figure 3:
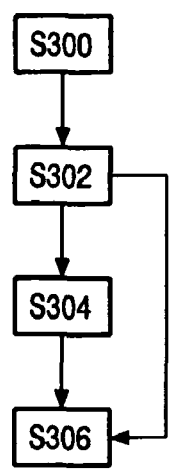
FIG. 3 illustrates an embodiment of the method according to the invention for a logical mount process

FIG. 3 illustrates an embodiment of the method according to the invention for a logical mount process. Within the first step S300, a DVD disk is first mounted physically.

Within the next step S302, the logical mount process is started. The driver code checks for the presence of a value indicating a plug-in. The value can for example be a pointer to the position of the plug-in on the disk. If the plug-in is found, the method continues with step S304. If the plug-in is not found, the method continues with step S306.

Within step S304, the plug-in is installed as previously described and the method continues with step S306.

Within step S306, digital rights management and defect management, if applicable, is applied before mounting the file system of the disk.

Now, for example, if the plug-in contains a programmable hardware specification for a video decoder required for the video content on the disk, the plug-in with the programmable hardware specification is used to read the video content on the disk A programmable hardware specification refers to hardware, for example a Field Programmable Gate Array, that can be programmed by providing the hardware a specification of how the hardware should be configured.

In this case, control is not handed over to the plug-in. The plug-in describes how the programmable hardware that is responsible for the decoding process is configured. The rest of the system does not have to know that the decoder hardware has been optimized for the content on disc. During the mount procedure there is an instance where the firmware determines that a programmable hardware specification is present on disc and it uses this to program the hardware. Within the previous examples, other media disks like a Portable Blue (PB), CD, etc. can be used too.

The plug-in travels with the disc. One of the advantages is that the user does not have to get the plug-in from somewhere else. The plug-in is delivered in an area of the disc that is not directly accessible to the host, i.e. not in the user data area. This has the advantage that you do not need to mount the disc completely before you can load the plug-in. As a result, the functionality delivered by the plug-in can be on a low level. For instance, if the plug-in is located in a geometrically fixed location, as previously described, the drive can load the plug-in before the format of the disc is interpreted. The installation of the plug-in occurs early in the mount process of the disc, transparent to the user. The plug-in is applied to the drive not the host. The plug-in takes care that the driver code knows how to interpret the disc and how the driver code should act given the format on the disc. The result of standard read/write commands from the host can thus be altered thereby changing the functionality of the host. The thus delivered plug-in is preferably only active while the disc carrying the plug-in is mounted. This has the advantage that a limited amount of memory can be used to support the plug-in.

The plug-in could also be located in a Chip in Disk (CiD). In this case, before the disc itself is mounted the CiD is read and any plug-in found is loaded. The plug-in may specify the physical format and thus determine the physical mount process. It may specify the logical format and thus determine the logical mount process. It may determine application specific parameters. Or any combination of the three. Examples include location lead-in, lead-out, defect management type, sector lay-out, Digital Rights Management (DRM) hooks, hard links, codecs, transcoding parameters, etc . . .

The plug-in can contain for example a specification of the application format on the disk. In this case, the plug-in contains computer readable program code to generate a user interface. The plug-in further, specifies the location of the user interface and the computer readable program code to interpret this information.

As an other example, the plug-in can contain the requirement to enter an unlock code on the disk using a specific button sequence on the keypad of, for example, a mobile phone or a remote control. In this case, the plug-in specifies that some pre-processing, i.e. entering a code, is required before the disk may be played.

Figure 4:
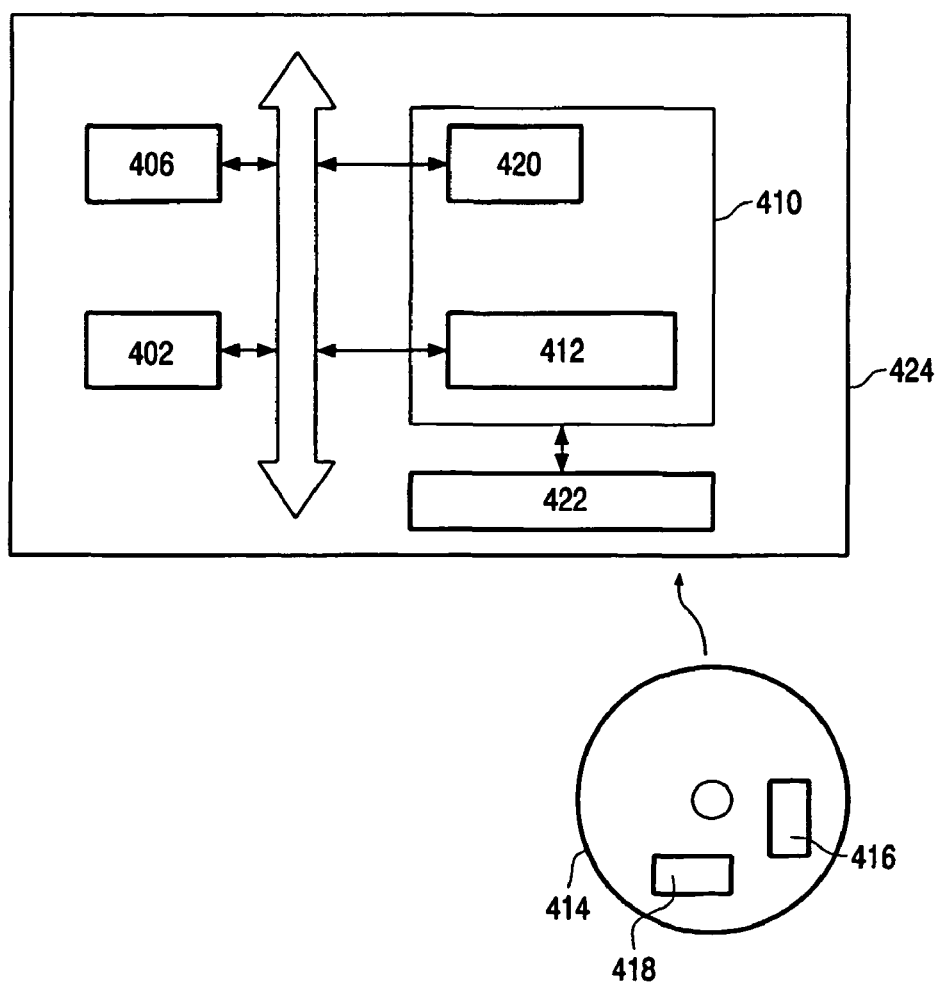
FIG. 4 illustrates a DVD player in a schematic way.

FIG. 4 illustrates a DVD player in a schematic way. The DVD player 424 comprises random access memory (RAM) 420, read only memory (ROM) 406 comprising the firmware, central processing unit (CPU) 402, software bus 408, driver 422, and system 410. The RAM 420, ROM 406, CPU 402, driver 422 and system 410 communicate with each other through software bus 408. The system 410 comprises a memory 412 that contains the computer readable code, so called driver code, to read and write data to and from driver 422. The driver 422 is designed to receive a DVD 414. The DVD comprises computer readable code 416 designed as a plug-in as previously described. The DVD also comprises computer readable code 418 designed as the content that should be read in by the driver code making use of the computer readable code 416 as previously described.

The order in the described embodiments of the method of the current invention is not mandatory, a person skilled in the art may change the order of steps or perform steps concurrently using threading models, multi-processor systems or multiple processes without departing from the concept as intended by the current invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a combination of these measures cannot be used to advantage.

The invention claimed is:

1. A non-transitory computer-readable medium including a computer program of instructions designed to be loaded into a memory of a computer, and responsive to being executed by the computer, causes the computer to perform a method of retrieving content data and instructional data from a storage medium, the method comprising:
providing a storage medium having content data and instructional data, the content data having a physical and logical format on the storage medium that is known to the instructional data, wherein the instructional data comprises plug-in data and has a physical and logical format on the storage medium that is known to firmware of a host device having an attached storage medium reading device, and further wherein the physical and logical format of the content data on the storage medium is incompatible and unknown to the firmware of the host device, the instructional plug-in data further being in an area of the storage medium not directly accessible to the host device;

retrieving, by means of the firmware of the host device and prior to mounting completely the storage medium with respect to the storage medium reading device, the instructional plug-in data from a predefined position on the storage medium, wherein retrieving the instructional plug-in data is transparent to a user of the host device; and retrieving, by means of the firmware of the host device enabled in cooperation with the retrieved instructional plug-in data, the content data from the storage medium to correctly further mount, physically and logically, a remainder of the storage medium with respect to the storage medium reading device, wherein plug-in enabled firmware of the host device conditionally re-routes procedure calls, and wherein the plug-in data (i) applies to the storage medium reading device and not to the host device and (ii) takes care that a driver code of the storage medium reading device knows (ii)(a) how to interpret the storage medium and (ii)(b) how the driver code should act for a given format of the storage medium.

2. The non-transitory computer-readable medium as claimed in claim 1, wherein the instructional data is located at a geometrically fixed location upon the storage medium.

3. The non-transitory computer-readable medium as claimed in claim 1, wherein the instructional data is comprised by an integrated circuit located at the storage medium.

4. The non-transitory computer-readable medium as claimed in claim 1, wherein the instructional data is located at an address that is relative to a physical address upon the storage medium, or cartridge containing the medium.

5. The non-transitory computer-readable medium as claimed in claim 1, the method comprising retrieving the instructional data from the storage medium before retrieving a file-system that is present upon the storage medium.

6. The non-transitory computer-readable medium as claimed in claim 1, the instructional data comprising access rights for retrieving the content data from the storage medium.

7. A system for retrieving content data and instructional data from a storage medium, the system comprising a processor; and the content data having a physical and logical format on the storage medium that is known to the instructional data, the instructional data being comprised of plug-in data and having a physical and logical format on the storage medium that is known to firmware of the system having an attached storage medium reading device, wherein further the physical and logical format of the content data on the storage medium is incompatible and unknown to the firmware of the system, the instructional plug-in data further being in an area of the storage medium not directly accessible to the system, the system being conceived to retrieve, by means of firmware of the system prior to mounting completely the storage medium with respect to storage medium reading device of the system, the instructional plug-in data from a predefined position on the storage medium, wherein retrieving the instructional plug-in data is transparent to a user of the system; and the system being further conceived to retrieve, by means of the firmware of the system enabled in cooperation with the retrieved plug-in instructional data, the content data from the storage medium to correctly further mount, physically and logically, a remainder of the storage medium with respect to storage medium reading device of the system, wherein plug-in enabled firmware of the system conditionally re-routes procedure calls, and wherein the plug-in data (i) applies to the storage medium reading device and not to the system and (ii) takes care that a driver code of the storage medium reading device knows (ii)(a) how to interpret the storage medium and (ii)(b) how the driver code should act for a given format of the storage medium.

8. An entertainment device having a processor and a memory comprising the system according to claim 7.

* * * * *